(12) United States Patent
Rehberg et al.

(10) Patent No.: US 6,299,177 B1
(45) Date of Patent: Oct. 9, 2001

(54) PLUG MEANS FOR CLOSING HOLES IN THE BODY OF VEHICLES

(75) Inventors: Karsten Rehberg, Igersheim; Jens Sturies, Wettstetten; Heiko Weiner, Creglingen, all of (DE)

(73) Assignee: ITW-Ateco G.m.b.H., Rottingen (DE)

( * ) Notice: Subject to any disclaimer, the term of this patent is extended or adjusted under 35 U.S.C. 154(b) by 0 days.

(21) Appl. No.: 09/333,291

(22) Filed: Jun. 15, 1999

(30) Foreign Application Priority Data

Jun. 25, 1998 (DE) .............................................. 198 28 328

(51) Int. Cl.⁷ ...................................................... F16J 15/00
(52) U.S. Cl. ............................ 277/634; 277/630; 277/650
(58) Field of Search ..................................... 277/603, 616, 277/627, 630, 634, 637, 644, 648, 650; 16/2.1

(56) References Cited

U.S. PATENT DOCUMENTS

| | | | |
|---|---|---|---|
| 3,659,320 | * | 5/1972 | Meyer ...................................... 24/297 |
| 4,081,879 | * | 4/1978 | Rubright ........................... 277/650 X |
| 4,089,496 | * | 5/1978 | Mizusawa ............................ 16/2.1 X |
| 4,647,262 | * | 3/1987 | Yokota .................................... 24/453 |
| 4,878,792 | * | 11/1989 | Frano ...................................... 24/615 |
| 4,912,287 | * | 3/1990 | Ono et al. ......................... 277/634 X |
| 5,144,777 | * | 9/1992 | Fishel et al. ......................... 16/2.1 X |
| 5,189,779 | * | 3/1993 | Fishel et al. ......................... 16/2.1 X |
| 5,806,139 | * | 9/1998 | Anderson et al. ....................... 16/2.1 |

FOREIGN PATENT DOCUMENTS

1530304 * 10/1978 (GB) .................................... 277/630

* cited by examiner

*Primary Examiner*—Lynne H. Browne
*Assistant Examiner*—Robert G. Santos
(74) *Attorney, Agent, or Firm*—Lowe Hauptman Gilman & Berner, LLP

(57) ABSTRACT

Plug means for closing holes in the body of vehicles, whereby it comprises valve means having a valve member which normally is biased towards a sealing edge and which opens if a predetermined pressure drop between the interior of the body and the exterior thereof occurs.

14 Claims, 1 Drawing Sheet

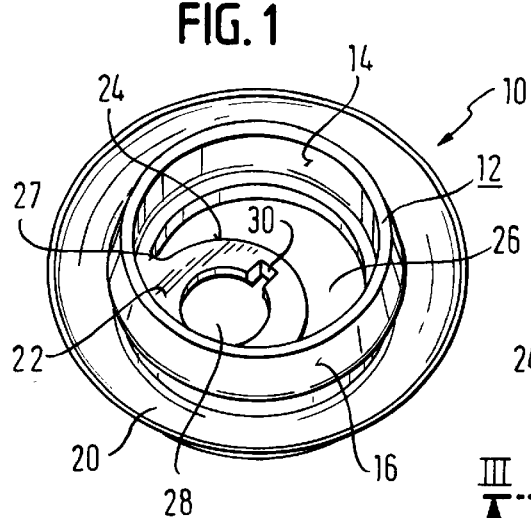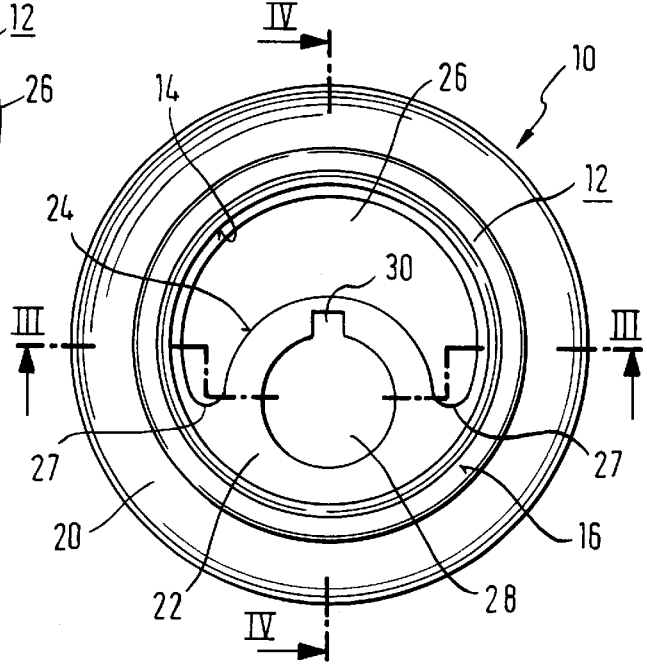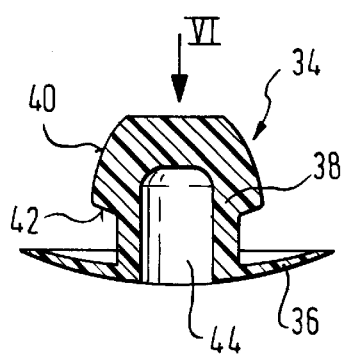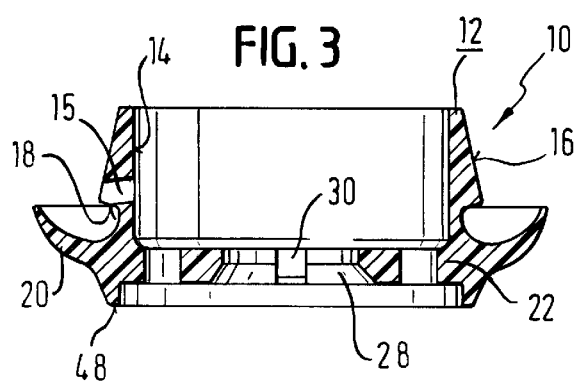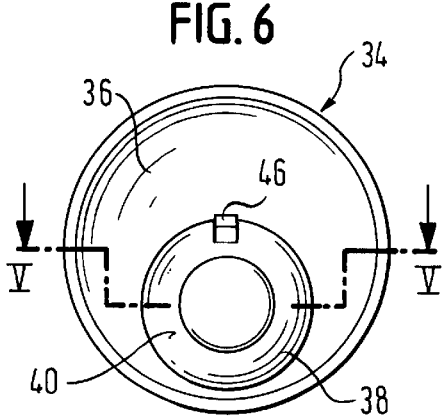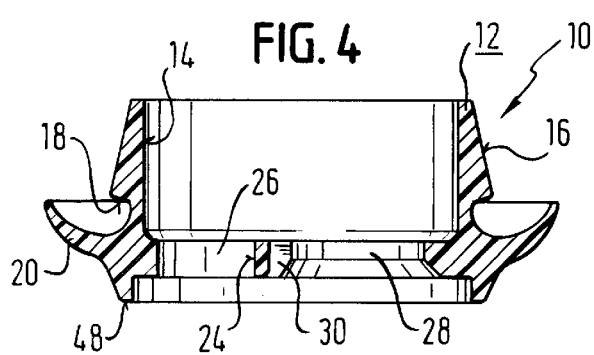

PLUG MEANS FOR CLOSING HOLES IN THE BODY OF VEHICLES

BACKGROUND OF THE INVENTION

The invention relates to a plug for closing holes in a vehicles body.

It is known to close so-called paint run-off holes in body parts, such as in the door region or likewise with hole plugs of plastic. In this manner, corrosion from contaminants or moisture penetrating into the inside of the body is prevented. On the other hand, it is disadvantageous that penetrated contaminants such as dust granules, loose particles and also moisture may no longer escape after the sealing of the cavity.

BRIEF SUMMARY OF THE INVENTION

It is therefore an object of the invention to provide a plug to prevent the penetration of dust and moisture from outside into the body parts of automobiles, but permit the escape of contaminants and collected water. The holes to be closed may have a circular, square or rectangular contour.

The plug according to the invention contains a valve having a valve member that bears under normal against a sealing edge. With a drop in pressure from the body inside to the outside by a predetermined amount, the valve opens so that water may flow out from the inside of the body part. If this has been effected, the valve returns to its closed position and prevents the penetration of dust and moisture.

The valve is located in a plug which is fastened in a hole in a suitable manner. Such plugs are known in a multitude of embodiments. They are normally plastic and are clipped into a hole. With this it is important that accommodation of the plug in the hole is such that an adequate sealing is ensured.

According to one formation of the invention the valve member is formed by a flexible diaphragm. Various possibilities are conceivable for forming the diaphragm or positioning in the plug such that the desired function is guaranteed. One formation of the invention for this envisages the membrane to be biased against a sealing edge of the plug by way of an inherent spring effect.

The diaphragm may be provided as a separate part in the plug arrangement whereupon this will be gone into in more detail further below, or be integrally formed with the valve body which is formed as a hole plug. The valve body is preferably of a relatively hard material and the diaphragm of a relatively soft material. Plastic could methods—two-component manufacture in one tool—are known for the manufacture of integral parts of different materials. Another method permits the molding of the hole plug on the one side and the injection of the diaphragm part to or around the hole plug in a second could on the other side.

According to a further formation of the invention the diaphragm, as already mentioned, is formed separately from the valve body formed as a hole plug. The diaphragm is connected to a shank which may be clipped into a receiving opening of the valve body. The valve body comprises a circumferential sealing edge against which the diaphragm normally bears. If however there occurs a pressure difference at the diaphragm on account of a water column within the body part or also on account of the fact that temporarily with respect to the surroundings, within the automobile an excess pressure is produced, the diaphragm is lifted from the sealing seat to a greater or lesser degree, by which means fluid may be drained and air may escape. Normally however the hole would be closed so that dust or other contaminants may not penetrate into the inside of the body part. The diaphragm is designed such that only slight forces are adequate in order to let it be lifted partly from the sealing seat, and on the other hand it must constantly maintain the sealing. In this context one formation of the invention envisages the diaphragm to be circular and the shank to be mounted eccentrically on the diaphragm, and the receiver opening in the valve body to be arranged correspondingly eccentrically to the annular sealing edge. By way of this the diaphragm towards one side has a relatively large "lever arm" so that already a relatively small weight of the water column or a slight air pressure difference is sufficient in order to slightly deform the diaphragm and to permit the fluid to flow out.

The receiver opening in the valve body is preferably formed in a bottom portion which is located within the hollow valve body and extends radially inwards from the inner side of the valve body. A large part of the "bottom" thus remains free. A large part of the diaphragm lies free and is exposed to the described pressures or pressure differences for the purpose of deformation of the diaphragm and lifting from the sealing edge. A circular arc shaped outer contour of the bottom portion permits a deformation of the diaphragm against a resistance which is not so large.

The shank on the diaphragm is preferably a resilient prong which cooperates with a radial relief of the receiver opening in order to create an orientation of the diaphragm relative to the valve body. The prong is furthermore designed such that it latchingly grips behind the edge of the relief when the shank is completely introduced into the receiver opening.

The shank furthermore comprises a shoulder which grips behind the hole edge when the shank is introduced. Since the outer diameter of the shoulder is larger than the diameter of the receiver opening, the shank on introduction into the receiver opening must be temporarily deformed radially inwards. The shank must therefore according to a further embodiment of the invention be formed hollow but closed towards the free end so that no passage is created between the inside of the body and the outside.

The valve body or the plug comprises, according to another formation of the invention, a sleeve-like portion which on the outside is conical and converges towards the free end. By way of this with a radial deformation of the sleeve-like portion it may be inserted into the hole, wherein then a shoulder grips behind a hole edge. Furthermore there is provided a radial flange which bears sealingly against the outer side of the body when the plug has been completely inserted into the hole. By way of this a sealing arrangement of the plug in the hole is given and a passage of fluid is only possible from the inside to the outside.

BRIEF DESCRIPTION OF THE DRAWINGS

The invention is hereinafter described in more detail by way of the drawings.

FIG. 1 shows perspectively a valve body obliquely from above, of a plug according to the invention.

FIG. 2 shows a plan view of the valve body according to FIG. 1.

FIG. 3 shows a section through the valve body according to FIG. 2 along the line 3—3.

FIG. 4 shows a section through the valve body according to FIG. 2 along the line 4—4.

FIG. 5 shows a section through a valve plug according to FIG. 6 along the line 5—5.

FIG. 6 shows a plan view of the valve plug according to FIG. 5 in the direction of arrow 6.

DETAILED DESCRIPTION OF THE INVENTION

As can be deduced from the FIGS. 1 to 4, a valve body 10 comprises a sleeve-shaped portion 12 with an approximately cylindrical bore 14 and a conical outer contour 16 which converges towards the free end, i.e. in the FIGS. 1, 3 and 4 upwards. At a distance to the free end the sleeve-shaped portion 12 is provided with a circumferential or annular shoulder 18 which runs somewhat obliquely to the axis of the sleeve-shaped portion 12. At a distance to the shoulder 18 there is formed a flange 20 which faces radially outwards. It has a circular arc shaped cross sectional contour and extends axially tip to the height of the shoulder 18. The sleeve-shaped portion 12 comprises several radial openings just above the shoulder 18 (FIG. 3) for leading away water, dust or likewise into the inside of the valve body 10. The valve body 10 is applied into a hole of a body part, which is not shown, for example in the boot space, in the door region, in the underfloor or in the front vehicle part, and specifically with the free end introduced from below, wherein on account of the conical outer contour 16 the sleeve portion 12 is temporarily deformed inwards until the shoulder snaps behind the hole edge. At the same time the free edge of the sealing flange 20 bears against the outer surface of the body part.

In the inside of the valve body 10 below the sleeve-shaped portion 12 roughly at the height of the flange 20 there is formed a bottom portion 22. It is formed as a semicircular projection or web and extends on the inner side of the valve body 10 radially inwards. The bottom portion has, as a result, a circular contour 24. It extends somewhat beyond the middle of the body 10, but still leaves an adequately large space 26 for the purpose yet to be described. As can be recognized in FIG. 2 and also in FIG. 1 the circular contour 24 roundly blends into the valve body as is indicated at 26.

In the bottom portion 22 there is formed a circular receiver opening 28 which comprises a radial rectangular enlargement 30 pointing in the direction of the free space 26.

As is deduced from the FIGS. 3 and 4 the bottom portion 22 in the region of the hole edge is beveled, wherein the beveling converges upwards.

In the FIGS. 5 and 6 there is shown a valve plug 34 which consists of a spherical segment shaped diaphragm 36 and a shank 38. Towards the free end the shank is formed spherically as is to be recognized at 40, wherein the shank 38 tapers towards the free end. Below the spherical portion 40 there is formed an oblique annular shoulder 42. The shank 38 is provided with a pocket hole 44 which is formed in from the diaphragm side. The pocket hole serves for the automatic assembly with the help of a robot which is not shown.

As is deduced from FIG. 6 the shank 38 at one location is formed with a spring prong 46 which can be bent radially inwards. It protrudes somewhat beyond the outer contour of the shank 38 in the spherical region and serves as a rotational securement for the valve plug 34.

The valve plug 34 with its shank 38 is introduced into the receiver opening 28. wherein the prong 46 cooperates with the enlargement 30, by which means a suitable orientation of the rotational position of the diaphragm plug with respect to the valve body 10 is obtained. If the shank 38 is completely inserted the prong snaps behind the edge of the enlargement 30. On introducing the shank 38 this is deformed radially inwards until the shoulder 42 snaps behind the edge of the receiver opening 28. With this the diaphragm 36 bears against a scaling edge 48 of the valve body 10, which is arranged below the receiving body in an annular maimer. In this manner the hole into which the valve body 10 is clipped is protected against the penetration of dust, moisture or likewise. If however on the inner side of the body part there is formed a greater or lesser column of water, by way of this the diaphragm 36, on account of the force of the weight, is deformed downwards to a greater or lesser degree and lifts from the sealing edge 48 so that water may run out. After this has been effected the diaphragm 36 again bears against the sealing edge 48 and closes the hole again.

The outer-middle arrangement of the shank 38 permits a relatively long, moment arm for deforming the diaphragm 36. This may therefore be equipped with an adequate spring force in order to ensure a secure closing in the normal case. On the other hand already a relatively small column of water is sufficient to lift the edge of the diaphragm from the sealing edge 48.

The material for the valve body 10 and the valve plug 34 is preferably of plastic. With this the material for the valve plug 34 may be somewhat softer than that for the valve body 10 which may be formed of relatively hard material.

What is claimed is:

1. A plug for closing a hole in a body of a vehicle, comprising a valve body and a valve member received therein and which normally is biased towards a sealing edge of the valve body to seal a passage extending through the valve body, said valve member being arranged to deform and thereby movably open the through passage if a predetermined pressure drop between the interior of the vehicle body and the exterior thereof occurs.

2. The plug of claim 1, wherein the valve member includes a flexible diaphragm.

3. The plug of claim 2, wherein the diaphragm is structured to be resiliently biased towards the sealing edge by an inherent resilient force.

4. The plug of claim 2, wherein the diaphragm is integrally formed with the valve member, the valve body being of relatively hard material while the diaphragm is of relatively soft material.

5. The plug of claim 2, wherein the valve body is formed as a hollow plug with the diaphragm being part of the separate valve member, the valve member having a shank adapted to be snappingly received by a receiving opening of the valve body, the valve body having a continuous said sealing edge engaged by the diaphragm.

6. The plug of claim 5, wherein the shank has a resilient prong gripping behind an edge of the receiving opening when the shank is inserted into the sealing opening.

7. The plug of claim 6, wherein the receiving opening has a radially outwardly extending enlargement for the accommodation of the prong.

8. The plug of claim 5, wherein the shank has a shoulder which grips behind the edge of the receiving opening when the shank is pushed into the receiving opening.

9. The plug of claim 8 wherein the portion of the shank between the shoulder and the free end facing away from the diaphragm is spherical or convex and tapers towards the free end.

10. A plug for closing a hole in a body of a vehicle, comprising a valve body and a valve member received therein and which normally is biased towards a sealing edge of the valve body to seal a passage extending through the valve body, said valve member being arranged to open the through passage if a predetermined pressure drop between the interior of the vehicle body and the exterior thereof occurs, wherein the valve member includes a flexible diaphragm, wherein the valve body is formed as a hollow plug with the diaphragm being part of the separate valve member, the valve member having a shank adapted to be snappingly received by a receiving opening of the valve body, the valve body having a continuous said sealing edge engaged by the diaphragm, wherein the diaphragm is circular and the shank is attached to the diaphragm eccentrically, and wherein the receiving opening is eccentric with respect to the annular scaling edge in a corresponding manner.

11. A plug for closing a hole in a body of a vehicle, comprising a valve body and a valve member received therein and which normally is biased towards a sealing edge of the valve body to seal a passage extending through the valve body, said valve member being arranged to open the through passage if a predetermined pressure drop between the interior of the vehicle body and the exterior thereof occurs, wherein the valve member includes a flexible diaphragm, wherein the valve body is formed as a hollow plug with the diaphragm being part of the separate valve member, the valve member having a shank adapted to be snappingly received by a receiving opening of the valve body, the valve body having a continuous said seating edge engaged by the diaphragm wherein the diaphragm is circular and the shank is attached to the diaphragm eccentrically, wherein the receiving opening is eccentric with respect to the annular sealing edge in a corresponding manner, and wherein the receiving opening is formed in a bottom portion of the hollow valve body, the bottom portion extending radially inwardly from an inner side of the valve body.

12. A plug for closing a hole in a body of a vehicle, comprising a valve body and a valve member received therein and which normally is biased towards a sealing edge of the valve body to seal a passage extending through the valve body, said valve member being arranged to open the through passage if a predetermined pressure drop between the interior of the vehicle body and the exterior thereof occurs, wherein the valve member includes a flexible diaphragm, wherein the valve body is formed as a hollow plug with the diaphragm being part of the separate valve member, the valve member having a shank adapted to be snappingly received by a receiving opening of the valve body, the valve body having a continuous said sealing edge engaged by the diaphragm, wherein the diaphragm is circular and the shank is attached to the diaphragm eccentrically, wherein the receiving opening is eccentric with respect to the annular sealing edge in a corresponding manner, wherein the receiving opening is formed in a bottom portion of the hollow valve body, the bottom portion extending radially inwardly from an inner side of the valve body, and wherein the bottom portion has a circular shaped outer contour.

13. A plug for closing a hole in a body of a vehicle, comprising a valve body and a valve member received therein and which normally is biased towards a sealing edge of the valve body to seal a passage extending through the valve body, said valve member being arranged to open the through passage if a predetermined pressure drop between the interior of the vehicle body and the exterior thereof occurs, wherein the valve member includes a flexible diaphragm, wherein the valve body is formed as a hollow plug with the diaphragm being part of the separate valve member, the valve member having a shank adapted to be snappingly received by a receiving opening of the valve body, the valve body having a continuous said sealing edge engaged by the diaphragm, wherein the shank has a shoulder which grips behind the edge of the receiving opening when the shank is pushed into the receiving opening, wherein the portion of the shank between the shoulder and the free end facing away from the diaphragm is spherical or convex and tapers towards the free end, and wherein the shank is hollow and closed at the free end thereof.

14. A plug for closing a hole in a body of a vehicle, comprising a valve body and a valve member received therein and which normally is biased towards a sealing edge of the valve body to seal a passage extending through the valve body, said valve member being arranged to open the through passage if a predetermined pressure drop between the interior of the vehicle body and the exterior thereof occurs, wherein the valve body includes a sleeve portion provided with an outer conical contour which converges towards one end thereof while a continuous shoulder is formed at the other end which is adapted to engage and undergrip an edge of the hole if the plug is pressed into the hole, a radial flexible flange formed on the valve body being spaced from the shoulder for sealingly engaging an outer side of the vehicle body.

\* \* \* \* \*